United States Patent [19]

Schwartz et al.

[11] 4,433,022
[45] * Feb. 21, 1984

[54] THREE-DIMENSIONAL CEILING BOARD FACING

[75] Inventors: William C. Schwartz, Greensboro, N.C.; Paul B. Blalock, Norwood, N.J.

[73] Assignee: Burlington Industries, Inc., Greensboro, N.C.

[*] Notice: The portion of the term of this patent subsequent to Mar. 16, 1999 has been disclaimed.

[21] Appl. No.: 333,715

[22] Filed: Dec. 23, 1981

Related U.S. Application Data

[62] Division of Ser. No. 104,145, Dec. 17, 1979, Pat. No. 4,320,163.

[51] Int. Cl.³ .................. B05D 5/00; B05D 3/02; B32B 3/10; B32B 5/20
[52] U.S. Cl. .................. 428/158; 427/256; 427/258; 427/262; 428/159; 428/172; 428/195
[58] Field of Search .............. 428/158, 159, 160, 172, 428/195, 196, 197, 316.6; D25/97; 427/244, 256, 258, 262

[56] References Cited

U.S. PATENT DOCUMENTS

| D. 261,435 | 10/1981 | Weitzman et al. | D25/97 |
| 3,030,232 | 4/1962 | Morgenstern | 428/196 |
| 3,931,429 | 6/1976 | Austin | 428/159 |
| 4,091,160 | 5/1978 | Koss | 428/251 |
| 4,152,474 | 5/1979 | Cook | 428/137 |
| 4,162,342 | 7/1979 | Schwartz | 428/159 |
| 4,186,231 | 1/1980 | Weitzman | 428/158 |
| 4,234,641 | 11/1980 | Thompson et al. | 428/316.6 |
| 4,241,125 | 12/1980 | Canning et al. | 428/316.6 |
| 4,320,163 | 3/1982 | Schwartz et al. | 428/158 |

OTHER PUBLICATIONS

Textile World, Mar. 1976, pp. 81, 82 and 84, 428-159.

Primary Examiner—William J. Van Balen
Attorney, Agent, or Firm—Cushman, Darby & Cushman

[57] ABSTRACT

A three-dimensional printed ceiling board facing material is disclosed in which a greige, foam-coated fabric is selectively printed with an expandable print paste or foamable plastisol. Upon heating, the expandable or foamable coating is substantially increased in size and bonded to the coated substrate. Novel and attractive architectural effects and hand are achieved while the facing meets commercial requirements of light fastness, heat stability and flame resistance. The printed fabric is useful as a ceiling board facing when a highly visible three-dimensional appearance is required.

4 Claims, 7 Drawing Figures

THREE DIMENSIONAL PRINTED FABRIC

GREIGE FABRIC

FOAMED FABRIC

THREE DIMENSIONAL PRINTED FABRIC

THREE-DIMENSIONAL CEILING BOARD FACING

CROSS REFERENCE TO RELATED APPLICATION

This is a division of our earlier application Ser. No. 104,145 filed Dec. 17, 1979, now U.S. Pat. No. 4,320,163.

BACKGROUND OF THE INVENTION

The present invention relates to a decorative acoustical ceiling or wall surfacing fabric and more particularly to a foam-coated fabric provided with a three-dimensional decorative architectural pattern and a process for making this three-dimensional fabric. The fabric is used as a ceiling board facing or a wall facing.

There are several commercially available ceiling boards which utilize glass fabric as the decorative facing. Generally, however, the fabric covered board is spray painted in a separate operation to achieve the desired textured, three-dimensional, and nubby appearance. Ceiling board manufacturers have frequently expressed their need for a pre-finished fabric which would exhibit and retain a three-dimensional, nubby appearance, and which requires only lamination to a base substrate to produce a salable ceiling board.

Previous work has concentrated on utilizing various weave designs employing textured fill yarns as a means of obtaining a nubby appearance. Suitable fabrics were then padded with highly loaded solutions of resin and pigment for color and opacity. The fabrics which resulted, however, did not exhibit the required texture and nubby appearance sought by the industry.

A foam coated ceiling board facing is described in my U.S. Pat. No. 4,162,342 issued on July 24, 1979 in which a cellular foam coated fabric is made by sculpturing a layer of vinyl or acrylic foam on one or both sides of a nubby textured fabric. The foam is applied and distributed over the entire surface of the fabric. While the products described in my earlier patent exhibit an exhanced degree of loft, texture and nubbiness to the fabric, in many applications a further feeling of depth and dimension is desirable.

SUMMARY OF THE INVENTION

The present invention provides a truly three-dimensional fabric useful as a ceiling board facing or a wall board facing, and a process for making this three-dimensional fabric.

It is an object of the present invention to produce an improved flame-retardant fabric for ceiling board facing by printing a suitable base fabric with an expandable or foamable print paste resulting in a textured, three-dimensional appearance.

It is another object of the present invention to develop improved fabric for ceiling board facing which exhibits flame resistance, color stability (light fastness) and heat stability.

It is a further object of the present invention to develop improved fabric for ceiling board facing which exhibits distinct and varied surface three-dimensional features that are architecturally pleasing and commercially acceptable.

These and other objects are achieved by selectively applying to a suitable base fabric, either woven or non-woven, an expandable or foamable print paste in areas where the raised three-dimensional pattern is desired and causing the print paste to expand or foam to the requisite height under controlled drying and/or curing conditions. The three-dimensional fabric of the present invention has a highly visual three-dimensional look and has a coarse, rough and pebbly architectural hand. Various effects are readily obtained, both visually and spacially, by employing different print patterns, controlling the degree of foaming and hence the height of the print from the substrate surface. Dyes or pigments may be added to the print paste before expansion or the basic fabric may be colored or dyed before expansion of the print paste.

DESCRIPTION OF THE PREFERRED EMBODIMENTS

Figure 1:
FIG. 1 is an enlarged cross-sectional illustration of the grey, uncoated fabric.
Figure 2:
FIG. 2 is enlarged cross-sectional illustration of the fabric of FIG. 1 coated with a fairly uniform foam layer about 45 mils in average thickness.
Figure 3:
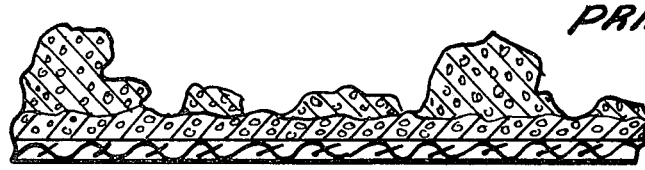
FIG. 3 is an enlarged cross-sectional illustration of the printed and foam-coated fabric of FIG. 2 having the expanded print paste on top of the foamed layer extending at various heights ranging from up to 70 to 160 mils in randomly distributed areas.
Figure 4:
FIG. 4 is a photograph of the present invention showing a white three-dimensional print on a grey foam-coated fabric.
Figure 5:
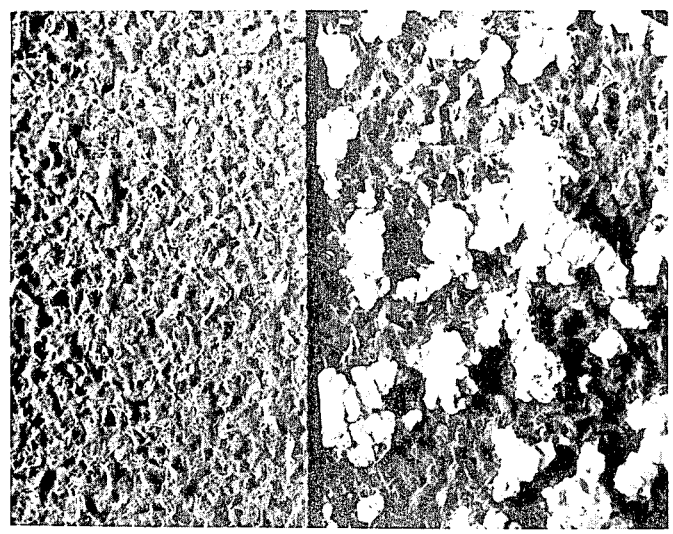
FIG. 5 is a photograph comparing the printed foam-coated fabric to the unprinted fabric.
Figure 6:
FIG. 6 is an enlarged cross-sectional view of the foamed, printed fabric.
Figure 7:
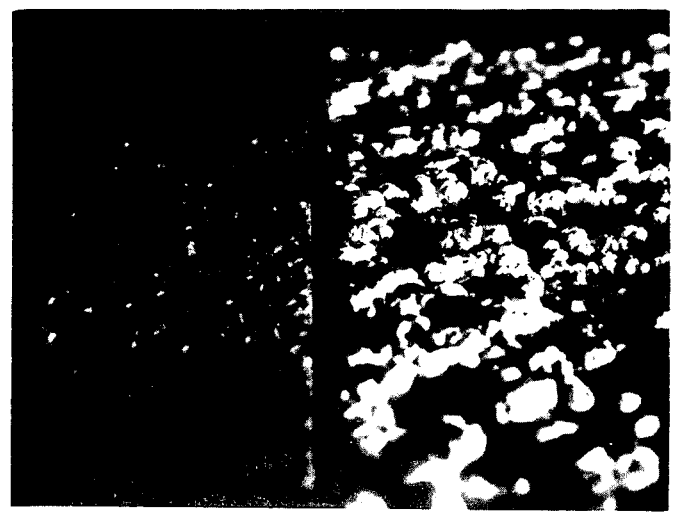
FIG. 7 is an enlarged photograph of both the printed and unprinted foamed fabric taken at about a 45° angle from the horizontal with a spotlight shining on the fabrics at approximately the same angle. This highlights the three-dimensional print which casts shadows on the surface.

The substrate to which the foamable or expandable print paste is applied is conveniently any fabric that is suitable for incorporation into a ceiling or wall surfacing panel. It is typically a flame-retardant fabric and may be either woven, knitted or non-woven. Preferably the fabric is a glass fabric because of its inherent non-flammable properties. An eminently suitable substrate is the foam coated ceiling board facing described in my earlier patent U.S. Pat. No. 4,162,342, the disclosure of which is incorporated herein by reference to the extent that it is necessary to describe such substrates.

The fabric used in the process of the present invention is preferably characterized by a certain degree of nubbiness and texture. The desired degree of nubbiness and texture may be obtained by using textured fill yarns. Texture is a term which describes the surface effect of a fabric, or the structural quality of a fabric. As defined in Man-Made Fiber and Textile Dictionary (Celanese Corporation 1974), texturing is a process of crimping, imparting random loops, or otherwise modifying continuous filament yarn to increase cover, resilience, abrasion resistance, warmth, insulation, and moisture absorption or to provide a different surface texture. As an example, one suitable textured fill yarn is identified as TEX 129 yarn, which is textured glass yarn manufactured by the Burlington Industrial Fabrics Division of Burlington Industries, Incorporated. TEX 129 yarn is manufactured by the air jet method, as described in the Man-Made Fiber and Textile Dictionary. In this method of texturing, yarn is fed through the turbulent region of an air jet at a rate faster than it is drawn off at the far side of the jet. In the jet, the yarn structure is opened, loops are formed, and the structure is closed again. Some loops are locked inside and others are locked on the surface of the yarn. The product of this process, such a TEX 129, is an entangled yarn suitable for use in the process of the present invention. Other textured yarns may also be used. In general, the bigger and bulkier the textured fill yarn, the greater the three-dimensional character of the final fabric. However, a balance between the bulky fill yarns and the smooth filament warp yarns is desirable. The desired balance gives the illusion of depth and leads to high and low areas in the fabric. TEX 129 yarn is considered to be a large bulky yarn suitable for use in the process of the present invention. Other textured fill yarns, including textured fill yarns which are smaller, may be used.

The fabrics used in the present invention are typically glass fiber fabrics. The glass fiber fabrics used are woven, knitted, or non-woven fabrics, most commonly woven and are composed of yarn made of glass fibers or filaments, or in the case of non-wovens, discrete glass fibers. However, any fabric which has the desired texture or nubby appearance may be used, provided that when the fabric is processed and printed according to the present invention, that the final product satisfy the relevant flammability specifications. The relevant flammability specifications are set forth in the test methods known as ASTM-E 84 or UL 723, which are hereby incorporated by reference. These methods test the fire hazard classification of building materials. For commercial products a class A rating as defined in these tests is generally desired.

Glass fiber fabrics are preferred in the process of the present invention since they are inherently nonflammable. A particularly preferred glass fiber fabric is identified as S/1963 and is sold by the Burlington Glass Fabrics Company, a division of Burlington Industries, Inc. of Greensboro, N.C. S/1963 fabric is made from a wrap yarn with 18 ends per inch of ECG 150 1/0 filament yarn, and a TEX 129 fill yarn with 16 picks per inch in the fill. An ECG 150 1/0 filament yarn is a fiberglass textile yarn, specifically an electrical glass, continuous filament yarn with an average filament diameter equivalent to 0.00036 inches and 15,000 yards of bare glass filament per pound. The "1/0" indicates that the yarn is made up of a single unplied strand.

The substrate to which the expandable printing paste is applied is preferably provided with a coating to receive and retain the expandable print paste. I prefer a foam coated surface as described in my earlier patent U.S. Pat. No. 4,162,342 in which a vinyl or acrylic based foam is applied over the entire surface of one or both sides of a suitable fabric substrate, although similar coatings may be used as well.

Typical expandable print pastes are based upon formulations containing microspheres which, upon heating to a predetermined temperature, expand and provide the desired depth and three-dimensional visual effect to the facing. These microspheres are hollow monocellular particles having a thermoplastic expandable synthetic resinous spherical particle with a spherical shape and containing encapsulated within as a generally spherical occlusion a liquid phase. This liquid phase is mostly a volatile organic liquid that becomes gaseous at a temperature which is below the glass transition temperature of the particle itself. Thus when heated to the desired temperature the shell becomes "plastic" and yields to the internal pressure of the liquid as it becomes a gas and the particle expands to form a monocellular hollow, generally spherical shell with a gaseous center. Such microspheres are formulated into a medium containing a cross-linkable resin or binder, various auxiliary additivies such as a defoamer, catalyst (to cure the resin), a wetting agent, a thickener and the like. When applied to a fabric substrate using a conventional printing technique and heated to a temperature at which the microspheres expand, the applied coating has a raised and textured surface. The relative thickness of the expanded spheres depends, of course, on the concentration of the microspheres in the print paste. The surface so produced will be textured or roughened by the irregularities caused by the expansion of the microspheres; the degree of texture is also largely dependent on the concentration of the microspheres in the print paste.

Microspheres of the type contemplated are described in U.S. Pat. No. 3,615,972 to Dow Chemical Company and have been formulated into a printing composition for achieving raised and graphic designs on fabrics as disclosed in U.S. Pat. Nos. 4,006,273 and 4,044,176 to Pratt & Lambert, Inc. Thus as one class of suitable materials, aqueous expandable print pastes are used which are available from the Spectrachem Corporation as Spectrapuff print pastes and from the Pierce & Stevens Company as Foamcoat print pastes. The Foamcoat materials are believed to contain an acrylic polymer, a blowing agent and possibly polystyrene. These aqueous expandable print pastes contain various binders or latex resins which increase in volume and become less dense as the microspheres also contained in the print paste expand. A typical formulation is:

| | |
|---|---|
| acrylic emulsion (resin) | 63.95 parts, |
| defoamer | 0.25 parts, |
| wetting agent | 0.10 parts, |
| glycol ether | 2.74 parts, |
| microspheres | 31.47 parts, |
| catalyst | 0.10 parts, |
| thickening agent | 1.39 parts |

(all by weight) according to U.S. Pat. No. 4,006,273, column 7, lines 53-60.

Another class of materials suitable for use as expandable printing pastes according to my invention are the foamable plastisols which contain blowing agents that release gases upon heating, as in the drying and curing operations.

Through proper selection of the blowing agent system, various foam densities and cell structures can be obtained. A typical blowing agent would be an azodicarbonamide which normally decomposes at 400°–410° F. and releases nitrogen, carbon monoxide, and carbon dioxide gases. These gases are responsible for expanding the plastisol and forming a cellular structure. In cases where the normal decomposition temperature of the blowing agent is too high for processing of the plastisol, chemical activators or promoters are typically added to reduce the temperature needed for decomposition. A typical formulation for producing a hard closed cell expanded plastisol is as follows:

| | |
|---|---|
| polyvinyl chloride resin | 100 parts |

| | |
|---|---|
| butyl benzyl plasticizer | 10 |
| epoxy plasticizer | 5 |
| blowing paste (azodicarbonamide) | 5-6 |
| dibasic lead phosphate stabilizer | 6 |

Those skilled in the art will appreciate that modifications in the above formulation are easily made and in some cases desirable for a plastisol which may be utilized for ceiling board application. Flame retardant low smoke generating plasticizers should be incorporated into the formula as well as antimony oxide for extra flame retardancy. Titanium dioxide can also be added for whiteness, opacity, and heat stability.

Another class of materials useful in achieving a raised or foamed print is a hydrophilic polyurethane prepolymer developed by W. R. Grace & Co. and available commercially as the Hypol foamable hydrophilic polymers. These polymers have the unique ability to form plastic foam with only the addition of water. For use in the present invention the prepolymer can be printed onto the fabric substrate then passed through a steam chamber to expand the foam and develop the necessary thickness.

Modifications to the basic formulation system are readily achieved by controlling the amount of water, type of surfactant, and the additives such as flame retardants or pigments, normally utilized for obtaining specific properties in the foamed product.

Conventional textile printing equipment can be utilized with minor modifications for printing the foamable polyurethane prepolymer on a fabric.

The three-dimensional printed ceiling or wall board facing must satisfy commercial requirements for flammability, acoustical and other building code-type specifications as well as consumer acceptance and durability standards, such as light fastness and heat stability.

Commercially available expandable print pastes of the type described above may not produce a commercially acceptable product with respect to light fastness and/or heat stability or may have unacceptable flame spread or rate of burning. Accordingly it is preferred to include in the print paste recipe used according to my invention various additives and agents that give the printed ceiling board facing fabric the desired service properties in addition to the obtained visual properties.

A preferred expandable print paste composition, according to the present invention, includes (1) an aqueous-based expandable print paste containing heat expandable microspheres therein, and to which has been added (2) a white powdered pigment such as titanium dioxide to give opacity and whiteness as well as to improve the heat stability of the expanded print; and (3) a flame retardant such as antimony oxide and aluminum hydrate to impart the necessary flame resistance. Also zinc oxide is included to reduce the time of afterglow in a flame test.

Clay-type fillers and talc powders may also be used, the only criterion being that the final product be opaque and sufficiently reflective for use as a ceiling board facing. The amount of white powdered pigment used typically ranges from about 10 percent by weight to about 50 percent by weight. These fillers impart a dry, raspy hand to the expanded print and greatly reduce the rubbery or spongy hand of the expanded print. Flame retardants, in addition to antimony oxide and aluminum hydrate, typically include non-flammable plasticizers such as tricresyl phosphate or flame retardant agents such as borax, boric acid, diammonium phosphate, a bromine liberating compound such as decabromobiphenyloxide or a combination of these. The amount of flame retardant material or system used is about 2 to about 20 percent by weight of the foam composition, the amount being sufficient to input the desired degree of flame retardancy to the product.

The print paste composition is formed by mixing the various materials described above. Typically, the various ingredients are mixed as follows: the dry pigments and powders such as antimony oxide, aluminum hydrate and titanium dioxide and zinc oxide are premixed with water to give a slurry or paste using e.g., a Cowles or Eppenbach mixer. Then the compound containing the expandable material is added to this slurry and mixed thoroughly. If increased viscosity is desired, suitable thickening agents such as sodium polyacrylate compounds in combination with ammonium hydroxide may be used.

The print paste composition is applied to the fabric substrate according to standard printing procedures and equipment used in the textile industry for producing raised prints. In order to achieve the desired visual effect the ceiling board facings require a substantial amount of print paste distributed on and adhered to the fabric substrate and for this purpose print rolls having deeper than normal engraving depths are preferred. It has been found that engraving depths of 10-50 thousandths of an inch give the desired expansion. Conventional textile rolls are typically engraved at depths of only 2-10 thousandths of an inch. Two or more different printing heights are also preferably used, for instance as achieved with a printing roll having corresponding engraving depths, as the resulting print pattern exhibits high and low areas which are considered to be more visually appealing than a similar pattern of only one height or level of expansion. Each engraving depth gives a corresponding thickness of print paste on the fabric substrate and, in turn, variations in the height of the decorative pattern extending above the surface of the fabric substrate. Generally the deeper the etching the more print paste is deposited and the greater the expansion, the greater is the three-dimensional effect. Similar results are obtained by using a plurality of rolls or one may use rotary screens, flat bed screens or other printing techniques available to the art. Preferred is the use of one or more rotary screens.

The fabric substrate used in the present invention is generally a greige fabric in an unbleached, undyed state that is preferably provided with a textured finish according to the process of my earlier U.S. Pat. No. 4,162,342, or with another finish. The fabric and/or the finishing thereon may be of any shade desired, for instance a grey substrate with white three-dimensional particles thereon. The darker the shade of the fabric substrate the less reflectance provided by the ceiling board. If so desired the print paste applied to the fabric substrate may be of multiple colors, for example by using multiple engraved rolls to apply the corresponding number of colored print particles.

After the print paste composition is applied to the fabric substrate the coated material is first dried for a period of time to drive-off the volatile components of the print paste then heated to a higher temperature to expand the foamable/expandable component of the print paste and to cure the print paste and fix it to the substrate. It is also convenient to dry, expand and cure in one operation, driving-off the volatiles and expanding the print paste under controlled conditions. The drying and curing procedure is an important part of the present invention necessary to provide for the expansion of the print paste and the three-dimensional result. Drying and curing times as well as temperatures are selected depending upon the requirements of the expandable component system of the print paste coupled with the amount of print paste applied to the fabric, the degree of expansion of the foam extending from the fabric substrate that may be desired.

The three-dimensional printed ceiling board facing fabric which is the product of the process of the present invention may be laminated to, for example a fiberous glass board, mineral wool board or the like to a substrate to produce a wall or ceiling board. The details of the lamination process will depend of course upon the type of adhesive used. In a preferred embodiment, a wet adhesive such as vinyl acetate based adhesives or acrylic based adhesives is applied to the sculptured fabric back and to a substrate material, such as a glass wool board. The sculptured fabric is pressed on the board using a roll to insure good contact. The coated substrate material may be heated to dry the adhesive. Ceiling boards manufactured by this technique exhibit a true three-dimensional appearance with the foamed pattern thereon greatly enhancing the loft, texture, and nubby appearance of the base fabric.

EXAMPLE 1

A three-dimensional ceiling board facing was prepared as follows. The fabric used was S/1963/48; 48 stands for the fabric width. The print paste composition contained the following components:

| | |
|---|---|
| 2 gal. | Foamcoat 50F (Pierce & Stephens) |
| 750 g. | decabromobiphenyloxide (50% dispersion) |
| 125 g. | antimony oxide |
| 150 g. | zinc oxide |
| 1,000 g. | titanium dioxide |
| 150 g. | aluminum hydrate |
| 300 g. | Aerotex Resin M-3 (American Cyanamid, melamine resin) |
| 750 g. | water |

The resulting print paste had a viscosity suitable for printing and was applied to the fabric using an engraved roll with two etching depths of 30 and 45 mils arranged in an architectural pattern.

The printed fabric was passed into a forced air drying oven set at 375° F. at a rate of 10 yards per minute with a residence time of about 1.5 minutes which treatment dried, expanded and cured the applied print paste. The resulting fabric was a three-dimensional printed ceiling board facing.

EXAMPLE 2

For a pigmented or tinted background the fabric of Example 1 was first provided with a uniform cellular foamed coating by applying a following foam composition containing Rhoplex HA-16 (90 parts), Geon 351 (210 parts), pigments and potassium stearate soap, foamed to the required density and applied to the fabric and dried to produce a uniformly coated layer on the fabric in accordance with the example of my U.S. Pat. No. 4,162,342. Next a three-dimensional expanded foam layer was applied as in Example 1, above. The resulting product had a grey pigmented color for the uniformly foamed cellular background layer and white expanded foam particles extending from the grey surface providing a visually pleasing architectural appearance.

What is claimed is:

1. A process of manufacturing a cellular foam coated three-dimensional ceiling board comprising the steps of:
    applying a foamable, expandable print paste on at least one surface of a fabric in an irregular architectural pattern said print paste including a pigment and a flame retardant wherein said print paste is applied in a discontinuous architectural pattern,
    expanding and curing the thus applied print paste to form raised areas on said fabric at the deposition points of said print paste to provide on said fabric a three-dimensional printed ceiling board facing material, and
    laminating the thus-produced fabric onto a substrate.

2. A process of manufacturing a cellular, foam-coated, flame-resistant ceiling board having a three-dimensional pattern printed thereon, said process comprising the successive steps of:
    (1) forming on at least one face of a fabric a uniform layer of cellular foamed latex containing vinyl chloride polymer, a cell producing surfactant, a powdered pigment and a flame retardant;
    (2) passing said fabric coated with a uniform layer of cellular foamed latex thereon between gapped means for removing foam and sculpturing said uniform layer of cellular foamed latex;
    (3) drying and curing said cellular foam coated fabric;
    (4) printing a foamable, expandable print paste onto the thus formed cellular foam coated surface of the fabric in a discontinuous predetermined architectural pattern, said print paste containing a pigment and a flame retardant;
    (5) expanding and curing the thus applied print paste to form raised areas on said fabric at the print paste deposition areas to provide a fabric having cellular, foam-coated, sculptured surface with a three-dimensional pattern thereon; and
    (6) laminating the thus-produced fabric onto a substrate.

3. A decorative ceiling board consisting of a facing fabric laminated to a substrate, said facing fabric including on one surface thereof a uniform cellular layer of foamed and cured material having had printed thereon a foamable, expandable printing paste in a discontinuous predetermined architectural pattern, the foamable printing paste having been expanded and cured.

4. A decorative acoustical wall or ceiling board consisting of a surfacing fabric laminated to a substrate, said fabric consisting of a fibrous glass fabric having had foamable printing paste printed on one side thereof in a discontinuous predetermined architectural pattern, the foamable printing paste having been expanded and cured.

* * * * *